No. 817,138. PATENTED APR. 3, 1906.
P. F. BRANDSTEDT.
FIREPROOF WINDOW AND CASING.
APPLICATION FILED MAR. 24, 1904.
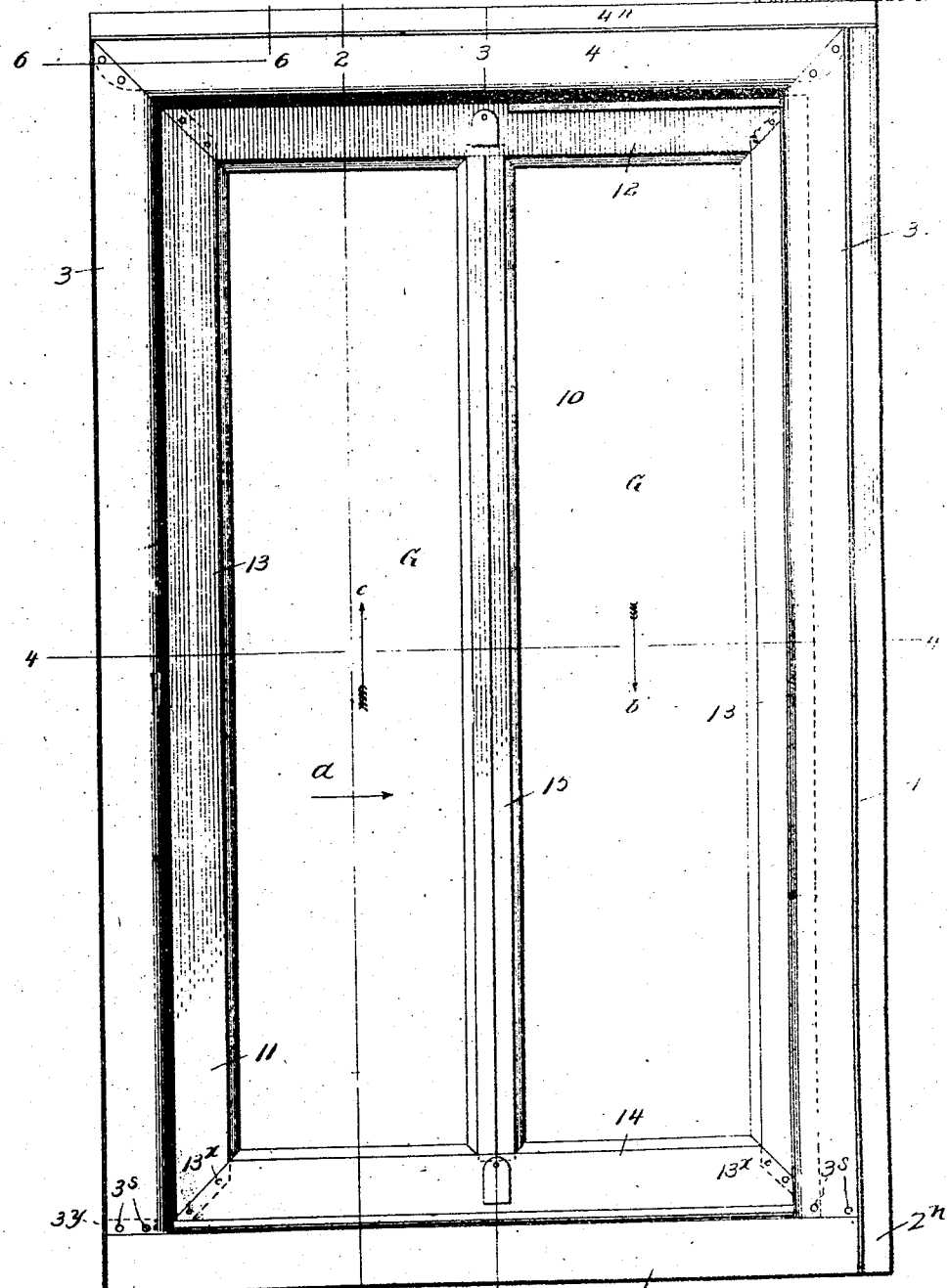

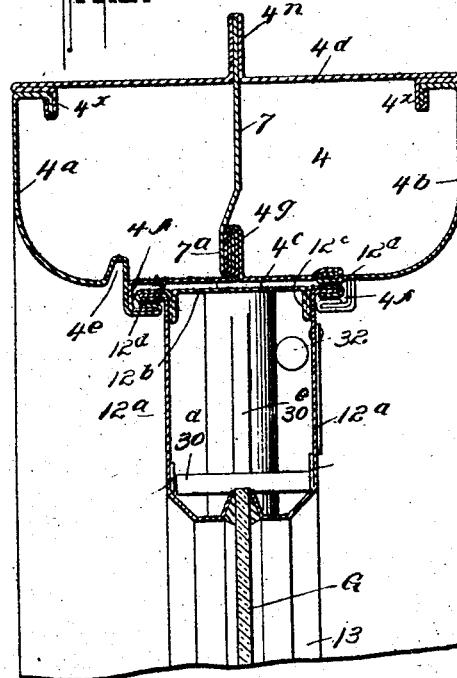
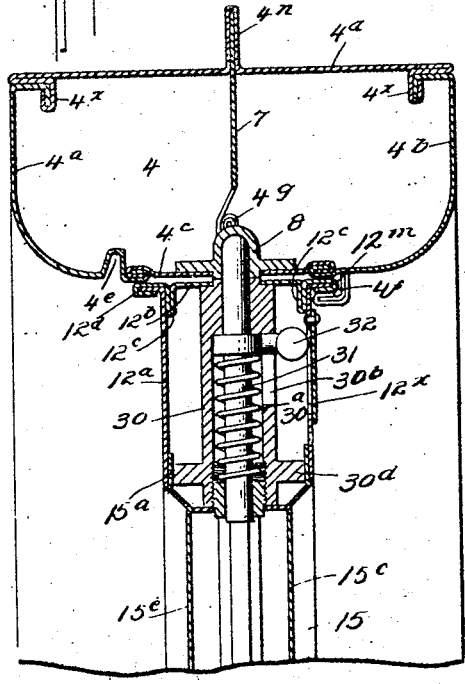
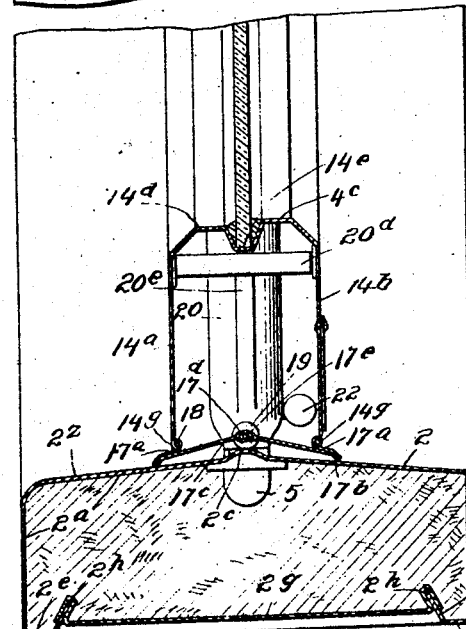
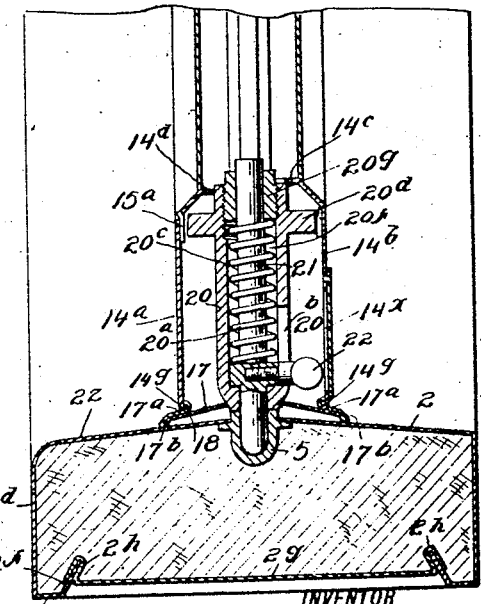

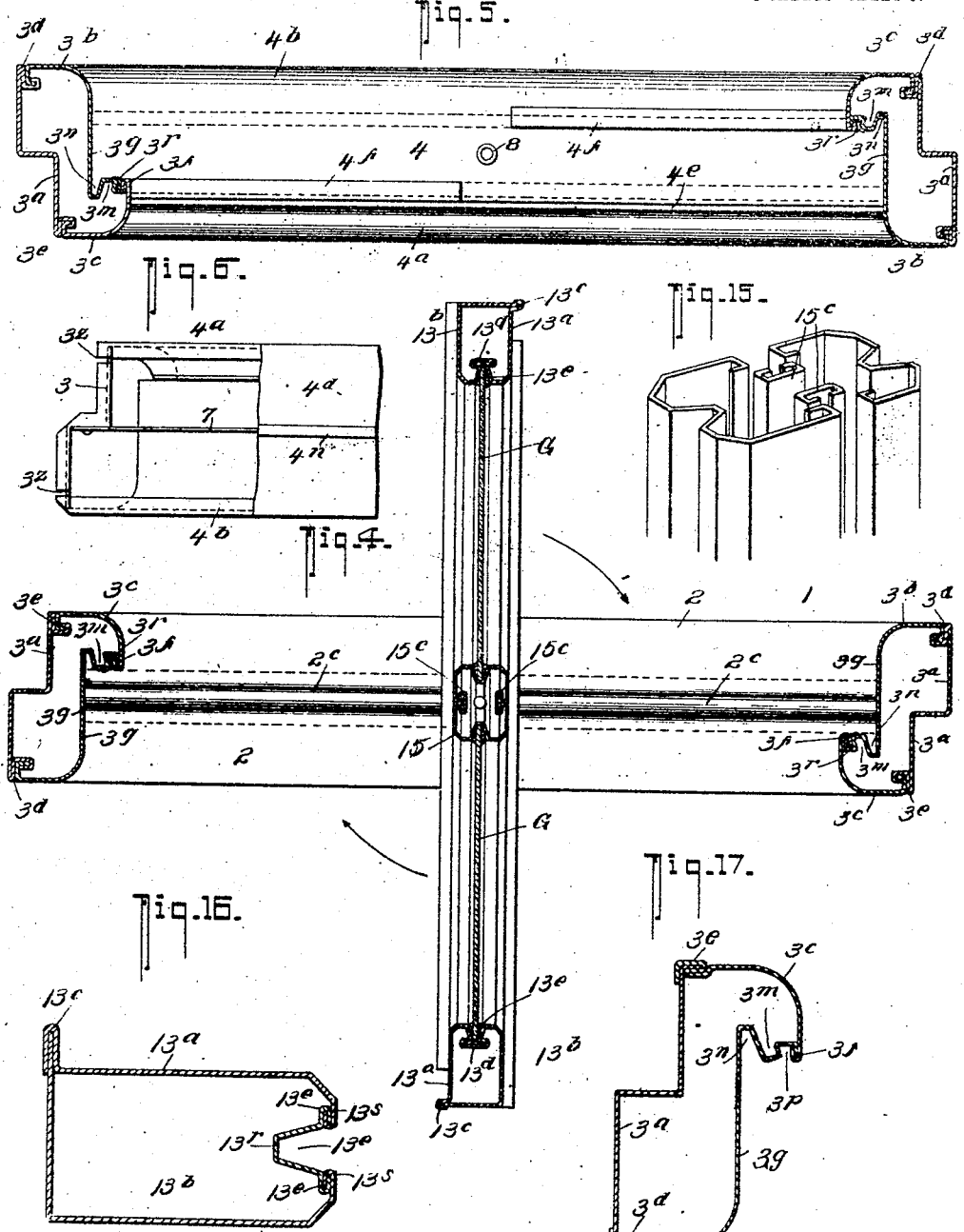

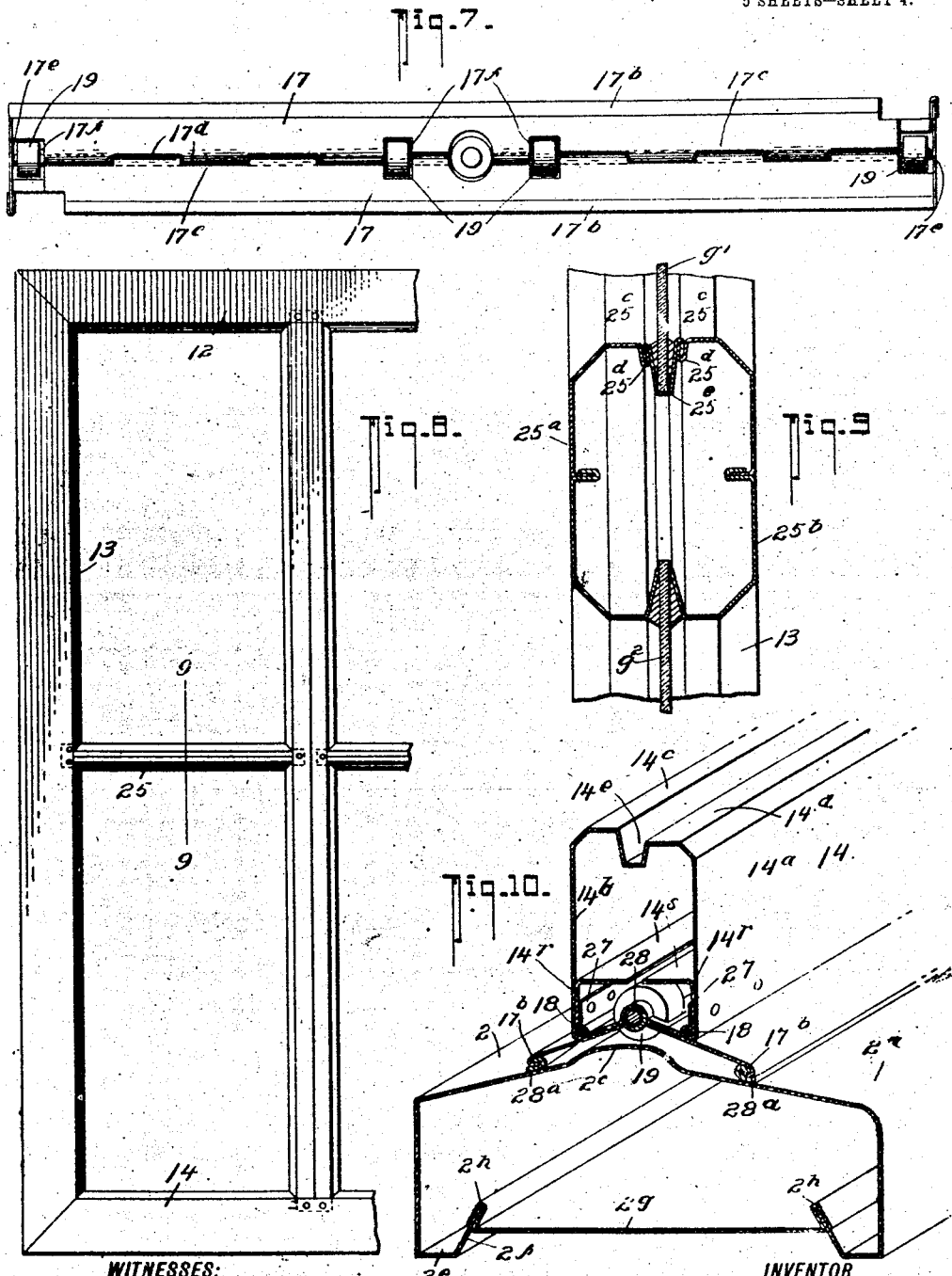

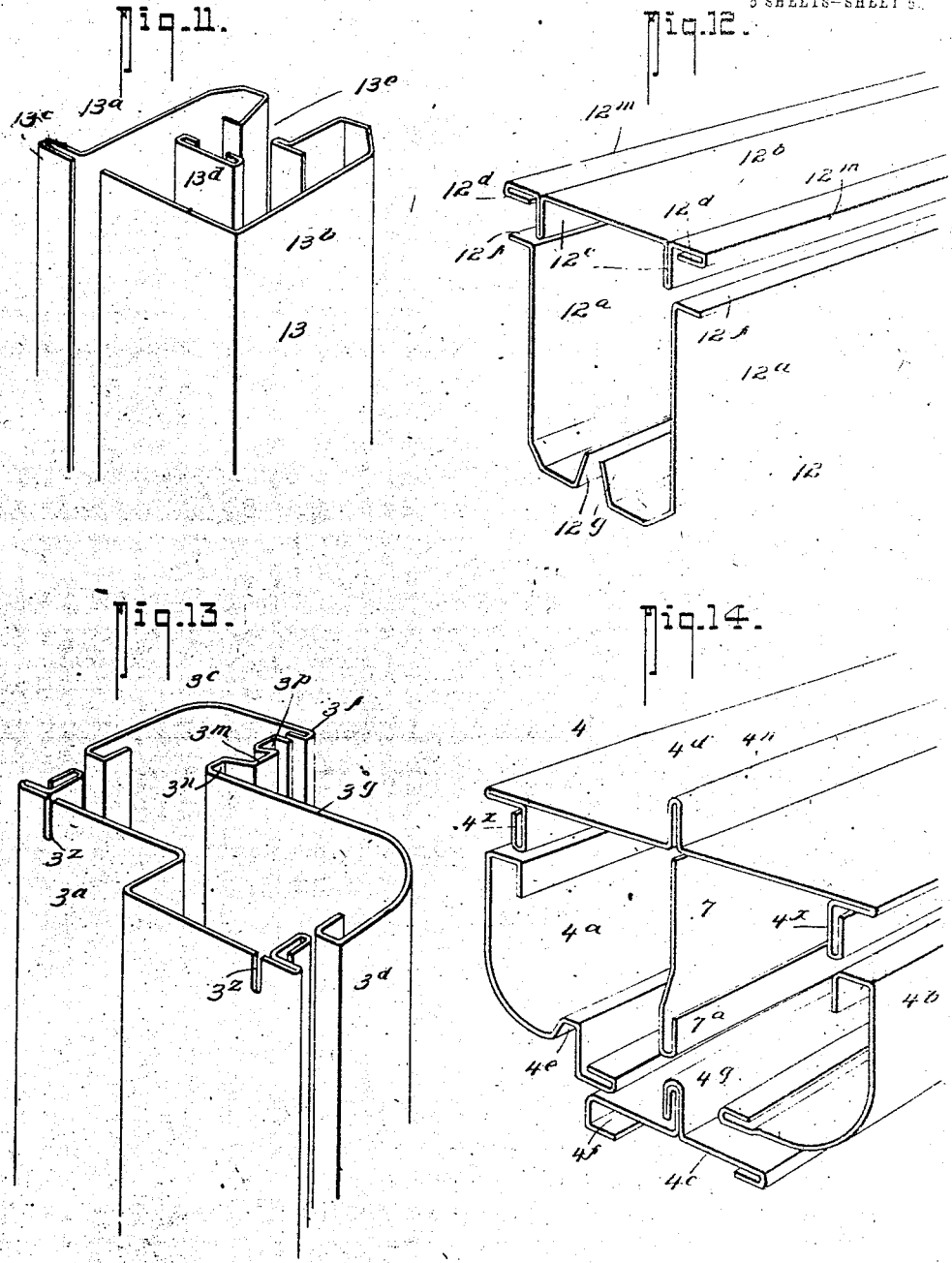

UNITED STATES PATENT OFFICE.

PAUL F. BRANDSTEDT, OF WASHINGTON, DISTRICT OF COLUMBIA, ASSIGNOR TO AMERICAN STANDARD FIRE-PROOFING CO., OF WASHINGTON, DISTRICT OF COLUMBIA.

FIREPROOF WINDOW AND CASING.

No. 817,138.     Specification of Letters Patent.     Patented April 3, 1906.

Application filed March 24, 1904. Serial No. 199,717.

*To all whom it may concern:*

Be it known that I, PAUL F. BRANDSTEDT, residing at Washington, in the District of Columbia, have invented certain new and useful Improvements in Fireproof Windows and Casings, of which the following is a specification.

My invention relates to improvements in window construction for fireproof buildings and the like, and it more particularly seeks to provide an absolutely fireproof window and casing and is a substitute for the ordinary window frames and casings now in common use.

Primarily, the invention provides an all-metal window frame and casing constructed entirely of sheet metal and which can be easily and cheaply manufactured and which will readily and effectively serve its intended purposes.

In its more detailed nature the invention comprises certain novel combinations and arrangement of parts, all of which will be described in detail, and then specifically pointed out in the appended claims, reference being had to the accompanying drawings, in which—

Figure 1 is a side elevation of my invention ready for use. Fig. 2 is a cross-section thereof on the line 2 2 of Fig. 1 looking in the direction of the arrow $a$. Fig. 3 is a similar view on the line 3 3 looking in the same direction. Fig. 4 is a horizontal section on the line 4 4 of Fig. 1 looking in the direction of the arrow $b$, the window being shown open in full lines and closed in dotted lines. Fig. 5 is a similar view on the line 4 4 of Fig. 1 looking in the direction of the arrow $c$. Fig. 6 is a detail section on the line 6 6 of Fig. 1. Fig. 7 is an inverted plan view of the window-frame. Fig. 8 is a side elevation of a slightly-modified form of window-frame. Fig. 9 is a cross-section thereof on the line 9 9 of Fig. 8. Fig. 10 is a detail cross-section of a slightly-modified form of weather-strip seal for the window-bottom. Fig. 11 is a detail perspective view of the parts forming the side portion of the window-casing. Fig. 12 is a similar view of the parts forming the top of the window-casing. Fig. 13 is a detail perspective view of the parts forming the side of the window-frame. Fig. 14 is a similar view of the parts forming the top thereof. Fig. 15 is a similar view of the parts forming the central support. Fig. 16 is a detail cross-section of a slightly-modified form of window-frame side parts. Fig. 17 is a detail cross-section of a further modification of window-frame side part.

Referring now to the accompanying drawings, in which like numerals and letters of reference indicate like parts in all the figures, 1 designates the window-casing, which comprises the sill 2, the sides 3, and the top 4, all of which is constructed of sheet metal in the manner presently explained.

Referring now more particularly to Figs. 1 to 5, inclusive, it will be seen the sill 2 is formed of two pieces $2^a$ $2^g$, the part or strip $2^a$ being substantially $\cap$-shaped in cross-section. The upper face $2^z$ of the sill 2 gradually slopes upwardly from the edges to the middle, where it is formed with a ridge $2^c$, running the entire length of the sill from one side of the casing to the other, for the purposes presently explained. The sides $2^d$ $2^d$ of the part $2^a$ are bent under, as at $2^e$ $2^e$, and upwardly, as at $2^f$ $2^f$, to receive the closure-plate $2^g$, formed with U-shaped ribs $2^d$ for interlocking with the upwardly-bent portions $2^f$ $2^f$, as shown in Figs. 2 and 3. At the middle point the sill 2 has an aperture to receive a socket 5, which is riveted or otherwise secured to the sill 2 for the purpose presently to appear. In practice the hollow sill thus formed will be filled with cement, as shown, to give it proper rigidity and strength.

The sides 3 of the casing, as best shown in Figs. 1, 4, and 5, are preferably constructed of three sheet-metal parts $3^a$ $3^b$ $3^c$, respectively, the part $3^a$ being substantially $\cap$-shaped and forming the side closure of the connecting-plate for the parts $3^b$ $3^c$, which are securely interlocked with the part $3^a$. The parts $3^b$ and $3^c$, as well as being interlocked with the part $3^a$, as at $3^d$ $3^d$, are also interlocked with each other, as at $3^f$. The part $3^b$ has a transverse face $3^g$ to abut the end of the window-frame side and a face $3^m$, extending at right angles to the face $3^g$ and formed with an inwardly-extending bead to produce a groove $3^n$, running the entire length of the side from top to bottom, and the said face $3^m$ is also formed, where it joins with the part $3^c$, with a pocket $3^p$, running its entire length, in which is held a lead packing $3^r$ for forming a water and air tight seal between the casing and the frame.

The sides 3 3 of the window-frame are securely joined to the sill 2 by the rivets $3^s$, as shown in Fig. 1, the part $3^a$ also serving as a closure for the end $2^n$ of the sill 2.

Referring now more particularly to Figs. 2, 3, 4, and 5, it will be seen the top 4 of the casing 1 comprises substantially the L-shaped face-strips $4^a$ $4^b$, the under connecting-strip $4^c$, which is securely interlocked with the face-plates $4^a$ $4^b$, and the upper connecting-strip $4^d$, also securely interlocked with the face-strips $4^a$ $4^b$, as shown best in Figs. 2 and 3. The outer face-strip $4^a$ is formed with an indentation to produce a groove $4^e$ for preventing the rain from coming into contact with the upper part of the window-frame. The face-plates $4^a$ $4^b$ and the under connecting-plate $4^c$, where they join, are formed for approximately one-half the width of the casing into ∩ shape to produce grooves $4^f$ $4^f$ on alternative sides of the casing and with which the window-frame top interlocks in the manner presently explained. The under connecting-plate $4^c$ is bent up centrally into a ∩ shape, as at $4^g$, to permit of the same being interlocked with the U-shaped portion $7^a$ of the stiffening-rib 7, which rib 7 is riveted at its end to the plate $3^a$, as shown in Fig. 6. The upper connecting-plate $4^d$ is also provided with a ∩-shaped portion $4^n$ to receive the stiffening-plate 7, as shown.

8 designates a socket similar in construction to the socket 5, which is riveted to the plate $4^c$ and held in alinement with the socket 5 for the purposes presently explained.

The top 4 is secured to the sides 3 by having the face-strips $4^a$ $4^b$ riveted to the parts $3^b$ $3^c$ on the side of the casing and by having the rib 7 secured to the part $3^a$, as before explained.

The window 10 comprises the frame 11 and the glass pane G, and the frame 11 consists of a top 12, the sides 13 13, the bottom 14, and the central member 15, all of which are constructed of sheet metal in the manner now to be explained.

The bottom 14 of the window-frame 11 is constructed of a single piece of metal bent in a substantially ∩ shape to form the front and back faces $14^a$ $14^b$ and the top faces $14^c$ $14^d$, the top faces being formed with an intermediate indentation or groove $14^e$ to receive the window-glass G, as shown. The outer face $14^d$ is in a lower horizontal plane than that containing the face $14^c$, so that should for any reason water gather in the groove $14^e$ it will flow over the outside instead of the inside. The bottom edges of the faces $14^a$ $14^b$ are formed with hinged portions $14^g$, through which and the hinged portions $17^a$ of the weather-strip 17 the hinged rods 18 pass. These sealing or weather strips 17 are best shown in Figs. 2, 3, and 7, by reference to which it will be seen the said strips run the entire width of the window-frame and have their edges $17^b$ bent to engage the sill and their adjacent edges $17^c$ formed into hinged portions $17^d$, through which a hinged rod $17^e$ passes. The strips 17 are cut away at intervals, as at $17^f$, to receive the rollers 19, mounted on the rod $17^e$ for riding the ridge $2^c$ of the sill 2 when the window is closed to tightly hold the edges $17^b$ in engagement with the sill, as best shown in Fig. 2.

Midway the ends of the bottom 1 place a socket 20, in which is held for vertical movement a short rod-section 21, having a finger-piece 22, and the said rod is adapted to pass down into the socket 5 of the sill and is held in such position by the coil-spring $20^a$, as shown. The socket 20 has a slot $20^b$ through which and a slot $14^x$ in the face $14^b$ the finger-piece 22 passes. The rod 21 forms the lower pivot or fulcrum for the window in the sill. The socket 20 may be of any approved construction; but I preferably form it as shown, with the main tubular body $20^c$, horizontal wing $20^d$ for engaging the top face of the window-frame bottom, and the side wings $20^e$ $20^e$, the said body $20^c$ having an enlarged bore $20^f$ to receive the rod 21 and the spring $20^a$, which spring and rod are held in their proper correlative positions in the socket by the bushing $20^g$, as shown in Fig.

The sides 13 are preferably constructed as shown in Figs. 1 and 4, by reference to which it will be seen each side 13 comprises two sections $13^a$ $13^b$, interlocked in such a manner as to form a rib $13^c$, running the entire length of the side from top to bottom, which strip $13^c$ enters into and coöperates with the groove $3^n$ in the casing-frame when the window is closed to form a seal between the casing and window-frame. The sections $13^a$ $13^b$ are also locked together by the ⊐-shaped strip $13^d$, and at this joint the sections $13^a$ $13^b$ are so formed as to produce a groove $13^e$, in which the window-glass rests. The sides are secured to the bottom 14 by rivets $13^y$ in any other equivalent manner.

The top 12 of the window-frame comprises a pair of substantially ⌐-shaped strips $12^a$ of precisely the same construction, the top closure consists of a plate $12^b$, which has integral ribs $12^c$ $12^c$ and whose edges $12^d$ interlock with the edges $12^f$ $12^f$ of strips $12^a$ $12^a$ to hold said strips in proper position. The strips $12^a$ $12^a$ are securely fastened at their ends to the ends of the side by rivets or otherwise and as clearly shown in Fig. 1, and the said strips have their ends $12^g$ $12^g$ separated to allow for the insertion of the window-glass G before the top plate has been put into place.

I place a socket 30 of the same construction as the socket 20 midway the ends of the top 12 and in alinement with the said socket 20 and the socket 8 in the window-casing top. In this socket is a rod-section 31, having a finger-piece 32 and surrounded by a coil-spring $30^a$ to maintain it in its proper normal position, the finger-piece 32 extending through a slot $30^b$ in the socket 30 and a slot $12^x$ in the member $12^a$, as shown in Fig. 3. The strips $12^a$ $12^a$ and the plate $12^b$ are so coöperatively joined to form ribs $12^m$ $12^m$, which coöperate with the grooves $4^f$ $4^f$ when the window is closed to form a seal between the window-frame top and the casing-top, as clearly shown in full lines in Figs. 2 and 3 and in dotted lines in Fig. 5. The socket 30 also includes a horizontal cross-wing $30^d$ and side wings $30^e$ $30^e$, similar to those of the socket 20.

In assembling the parts of my improved window-casing I proceed substantially as follows: I first interlock the side portions $3^b$ $3^c$ with each other and then secure them to the sill by the rivets $3^s$ and ears $3^y$, as shown in Fig. 1. I then secure the parts $4^a$ $4^b$ to the parts $3^c$ $3^d$, respectively, by the rivets, as shown, it being understood that before the parts $4^a$ $4^b$ are riveted to the parts $3^c$ $3^d$ the plate $4^c$ is placed in position to hold the parts $4^b$ in proper correlative arrangement. After this I place the stiffening-rib 7 in position by sliding it in from the end. Next I slide on the plates $3^a$, one of which has slots $3^t$ at its upper edge. I next slide on the top cover $4^d$; its interlocking portions $4^x$ $4^x$ passing through the slots in the part $3^a$, just referred to, it being understood that the socket 8 has been fastened to the plate $4^c$ before the top $4^d$ is placed into position. After the socket 5 has been fastened to the sill and before the plates $3^a$ are in position the said sill is filled with cement, the plates $3^a$ serving, as before stated, as a closure for the ends of the sill.
The window-casing is now ready for the reception of the window-frame.

In assembling the window-frame the parts to be riveted together are first assembled and riveted before the other parts are in position in substantially the following manner: The sides $13^a$ $13^b$ are interlocked with each other, as at $13^c$, and are riveted to the end of the bottom 14, after which the members $12^a$ $12^a$ are riveted to the members $13^a$ $13^b$, respectively. The locking-strips $13^d$ may be next placed into position, if desired. The center member 15 has its members $15^a$ $15^a$ riveted to the top and bottom parts before the interlocking strips $15^c$ are placed in position. After the parts $13^a$ $13^b$ have been riveted to the bottom and the parts $12^a$ $12^a$ riveted to the parts $13^a$ $13^b$ the sockets 20 and 30 are placed in position, after which the weather strip or seal 17 is secured to the bottom 14, as before explained. After the glass G has been slid in through the top of the window-casing the top plate or closure $12^b$ is slid into position from one end of the window-frame, it being understood that one of the members $13^b$ has cutaway portions to permit of the ready passage of the ribs $12^c$ $12^c$ while the member $12^b$ is being placed into position. The window is now ready for placing in the casing, which is done by simply withdrawing the rods into their respective sockets and placing the window into position, after which the rods are permitted to enter their respective sockets in the top and bottom of the frame, the rods serving as pivots, so that the window may swing open or shut, as indicated by arrows in Fig. 4, whenever it may be found desirable. It should be understood that as the window closes the rollers on the weather strip or seal on the bottom of the window-frame will ride the ridge $2^c$ to hold the said strips in engagement with the seal, as before explained, and as the window is opened the rollers will go down off the ridge to permit the window readily swinging on its pivots.

In Fig. 8 I have shown my window-frame as adapted for use with a multiple-pane window, and when so adapted the window-frame is provided with a horizontal cross-bar 25 of substantially the same construction in cross-section as the center bar, and, as more clearly shown in Fig. 9, this cross-bar 25 is composed of two parts $25^a$ $25^b$ of the same construction, and the said parts $25^a$ $25^b$ have upturned flanges $25^c$ $25^c$ to leave a passage-way therebetween and also U-shaped portions $25^d$ $25^d$ to receive a substantially U-shaped hanger-strip $25^e$, upon which the upper window $g'$ rests, it being understood that the lower window-pane $g^2$ is first placed in position, passing through the opening between the U-shaped members $25^d$ $25^d$ and down between the opening between the upturned members $25^c$ $25^c$, after which the hangers are placed in position and the upper pane $g'$ is placed in position.

In Fig. 10 I have shown a slightly-modified form of weather-strip seal for the window-bottom in which the weather-strips are connected to the bottom member by the hinges 27 27 and to each other by the hinges 28 28, the contacting edges of the weather-strips being provided with lead washers $28^a$, as shown, and in this form the bottom member 14 of the window-frame has its lower end bent back upon itself, as at $14^r$, and inwardly, as at $14^s$, to form practically a cover for the roller and weather-strip portions.

In Fig. 16 I have shown a cross-section of a slightly-modified form of window-frame side part, in which the members $13^a$ $13^a$ are formed with U-shaped ends $13^s$ and with which the U-shaped locking-strip $13^r$ coöperates, the strip $13^r$ serving to receive the window-pane.

Fig. 17 shows a further modification of window-frame side parts, showing a modified way of joining the parts 3ᵃ and 3ᵇ to the part 3ᵃ.

By constructing the window casing and frame entirely of metal I provide an absolutely fireproof structure, as there is absolutely no inflammable material present. By constructing the various parts of sheet metal rather than of solid casting I am enabled to more cheaply and durably construct the window frame and casing than would otherwise be possible. Should for any reason it be desired to remove the window-frame from its casing for reglazing or otherwise, it is only necessary to withdraw the rods into the respective sockets and out of engagement with the socket in the top of the window-casing and into the sill, when the window may be readily removed.

From the foregoing description, taken in connection with the accompanying drawings, it is thought the advantages, construction, and complete operation of my invention will be readily understood by those skilled in the art to which it appertains.

I desire it understood that slight changes in the detail arrangement and construction and design of parts may be made without departing from the scope of the appended claims.

It will also be noticed that I have provided a window frame and casing made of sheet metal in which there is absolutely no soldering and in which the parts are securely interlocked with each other by interlocking strips or are riveted to each other.

Having thus described my invention, what I claim, and desire to secure by Letters Patent, is—

1. A window construction of the character stated, comprising a casing having sill, top and side portions, said top, side and sill portions each being constructed of a plurality of separate sheet-metal parts securely interlocked with each other, said sides having grooved portions, a window mounted in said casing and including a frame, said window-frame having portions for coöperating with said grooved portions of the casing to interlock therewith when the window is closed, said window-frame having weather or sealing strips on its lower edges, and means for causing said strips to tightly engage the sill when the window is closed, said means including rollers carried by said strips and a ridge on the sill for coöperating therewith.

2. In a fireproof window construction, a sheet-metal casing comprising a sill portion, side portions and a top portion, said sill portion comprising a main body and a bottom closure-plate, said main body and closure-plate being interlocked with each other, and a cement filling for said sill, said side portions each being composed of three parts interlocked with each other and secured to the sill portion, said side portions each having a groove and a pocket, a washer held in said pocket, and a window pivotally mounted in said casing and having portions for coöperating with said casing side grooves in the casing side portions, for the purposes specified.

3. In a fireproof window construction, a sheet-metal casing comprising a sill portion, side portions and a top portion, said sill portion comprising a main body and a bottom closure-plate for said body, said main body and closure-plate being interlocked with each other to form a hollow chamber, and a cement filling for said chamber, said side portions each being composed of three parts interlocked with each other and secured to the sill, said top portion being composed of a top plate, side plates and the bottom plate, said top, side and bottom plates of the top portion being interlocked with each other and said side plates of the top portion being secured to the frame sides, a stiffener-rib for said top portion, said side portions each having a groove and a pocket, a packing held in said pocket, said top having grooved portions, a window pivotally mounted on said sill and top in the casing, said window having flange portions for coöperating with the groove in the casing sides, and flange portions for coöperating with the groove in the casing-top at predetermined times, for the purposes specified.

4. A window construction of the character stated, comprising a sheet-metal frame comprising a sill portion, a top and side portions, said sill portion having a ridge, said side portions each having a groove, said top having a pair of grooves on its under side, and a third groove near the outer edge of its under face, a window including a sheet-metal frame fulcrumed midway its sides to the sill and top portions of the casing, and adapted to be turned at right angles to said casing, said window-frame side portions including strips for entering the groove in the casing side portions when the window is closed, and said frame top portion including flanges for entering the first-mentioned pair of grooves in the casing-top when the window is closed.

5. A window construction of the character stated, comprising a sheet-metal frame including a sill portion, a top portion, and side portions, said sill portion having a ridge, said side portions each having a groove and a pocket, a washer or packing held in said pocket, said top having a pair of longitudinal grooves on its under side and a third longitudinal groove near the outer edge of its under face, a window including a sheet-metal frame fulcrumed midway its sides to the sill and top portions of the casing and adapted to be turned at right angles thereto in one direction only, said window-frame side portions including strips for entering the groove in the casing side portion when the window is closed, and said side portions adapted to abut the washer or packing held in the casing-pocket, said frame top portions including flanges for entering the first-mentioned pair of grooves in the casing-top when the window is closed.

6. In a window-casing including a sill portion, side portions and a top portion, said side portions each comprising interlocking sheet-metal strips $3^b$ $3^c$ and a joining-plate $3^a$ interlocking with said strips $3^b$ $3^c$, said strip $3^b$ including a straight face $3^g$ and a face $3^m$ at right angles to the face $3^g$, said strip $3^b$ including a groove $3^n$, a window centrally fulcrumed in said casing and including a frame having projecting strips to enter the groove $3^n$ when the window is closed, for the purposes specified.

7. In a window construction, including a casing having a sill portion, side portions and a top portion, said side portions each comprising interlocking sheet-metal strips $3^b$ $3^c$ and a joining-plate $3^a$ interlocking with said strips $3^b$ $3^c$, said strip $3^b$ including a straight face $3^g$ and a face $3^m$ at right angles to the face $3^g$, said strip $3^b$ including a groove $3^n$ and a pocket, a weather-strip packing held in said pocket with its free end projecting and overlapping the face $3^m$, a window centrally fulcrumed in said casing and including the frame having projecting strips to enter the grooves $3^n$ when the window is closed, said top portion of the casing comprising the members $4^a$ $4^b$, the bottom connecting member $4^c$ and the top connecting member $4^d$, said members $4^a$ $4^b$ each being interlocked with the member $4^d$ and being interlocked with the member $4^c$ in such manner as to provide grooves and flange portions $4^f$ extending about half-way across the top and arranged diagonally opposite and parallel with each other, said member $4^a$ being provided with a groove $4^e$, and said window-frame being provided with top flanges to coöperate with the groove and flange portions $4^f$ when the window is closed.

8. In a window construction, including a casing having a sill portion, side portions and a top portion, said side portions each comprising interlocking sheet-metal strips $3^b$ $3^c$ and a joining-plate $3^a$ interlocking with said strips $3^b$ $3^c$, said strip $3^b$ including a straight face $3^g$ and a face $3^m$ at right angles to the face $3^g$, said strip $3^b$ including a groove $3^n$ and a pocket, a weather-strip packing held with its free end projecting and overlapping the face $3^m$, a window centrally fulcrumed in said casing and including a frame having projecting strips to enter the grooves $3^n$ when the window is closed, said top portion of the casing comprising the members $4^a$ $4^b$, the bottom connecting member $4^c$ and the top connecting member $4^d$, said members $4^a$ $4^b$ each being interlocked with the member $4^d$ and being interlocked with the member $4^c$ in such manner as to provide grooves and flange portions $4^f$ extending about half-way across the top and arranged diagonally opposite to and parallel with each other, said member $4^a$ being provided with a groove $4^e$, and said window-frame being provided with top flanges to coöperate with the groove and flange portions $4^f$ when the window is closed, said portions $4^f$ serving as stops to limit the opening swing of the window.

9. In a fireproof construction for windows, a hollow casing comprising a sill portion, side walls and a top portion, each of which portions is separately composed of a plurality of sheet-metal parts having portions for interlocking with each other, a socket secured to said sill midway its ends and sides, a second socket likewise secured to the top and in alinement with the socket and sill, a window including a hollow frame, comprising the side, top, bottom, and intermediate sections, each of which sections is separately composed of a plurality of sheet-metal parts interlocked with each other and formed with glass-receiving portions, a socket mounted in the top and bottom of the window-frame midway the sides thereof, a spring-pressed bolt carried by each of said last-named sockets for projecting into the socket of the sill and casing-top to form a fulcrum for the window.

10. In a fireproof construction for windows, a hollow casing comprising a sill portion, side walls and a top portion, each of which portions is separately composed of a plurality of sheet-metal parts having portions for interlocking with each other, a socket secured to said sill midway its ends and sides, a second socket likewise secured to the top and in alinement with the socket and sill, a window including a hollow frame, comprising the side, top, bottom, and intermediate sections, each of which sections is separately composed of a plurality of sheet-metal parts interlocked with each other and formed with glass-receiving portions, a socket mounted in the top and bottom of the window-frame midway the sides thereof, a spring-pressed bolt carried by each of said last-named sockets for projecting into the socket of the sill and casing-top to form a fulcrum for the window, said window and said casing having interlocking longitudinal grooves adapted to interlock with each other when the window is closed, substantially as shown and described.

PAUL F. BRANDSTEDT.

Witnesses:
JOHN L. FLETCHER,
ALBERT E. DIETERICH.